Jan. 12, 1965  G. A. SHARMAN ETAL  3,164,978
APPARATUS FOR TESTING GYROSCOPES
Filed Aug. 31, 1959  7 Sheets-Sheet 1

INVENTORS
GODFREY A. SHARMAN
JOHN A. B. SHARMAN
BY
Wenderoth, Lind & Ponack
ATTORNEYS Jan. 12, 1965  G. A. SHARMAN ETAL  3,164,978
APPARATUS FOR TESTING GYROSCOPES
Filed Aug. 31, 1959  7 Sheets-Sheet 3
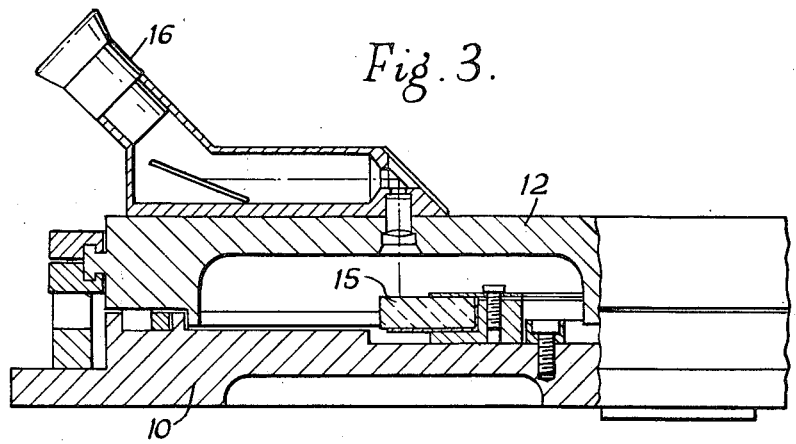
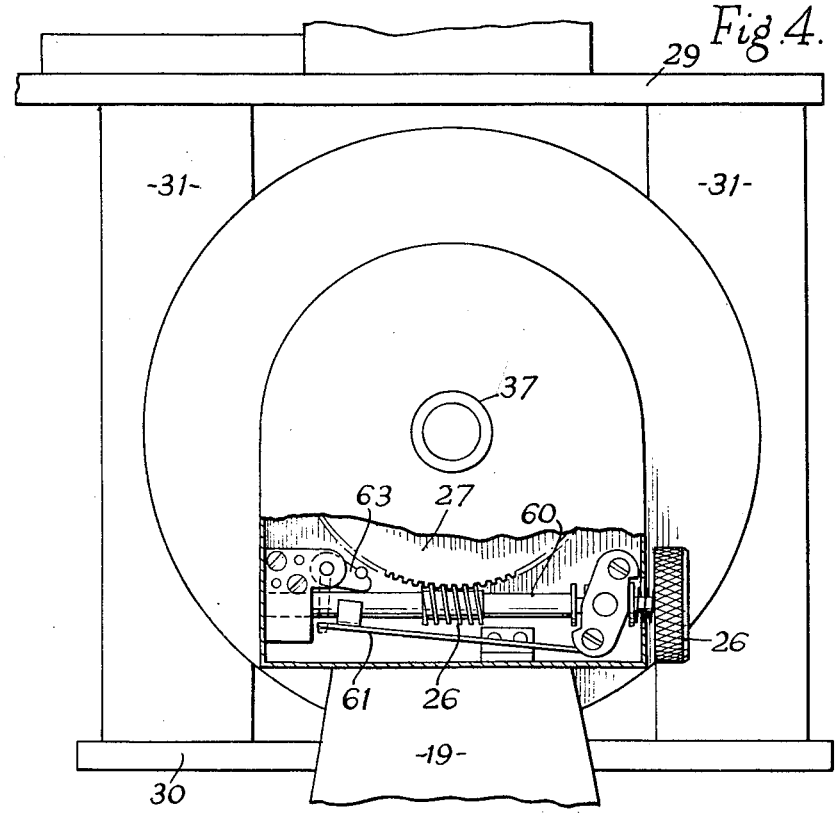
INVENTORS
GODFREY A. SHARMAN
JOHN A. B. SHARMAN
BY
Wenderoth, Lind & Ponack
ATTORNEYS

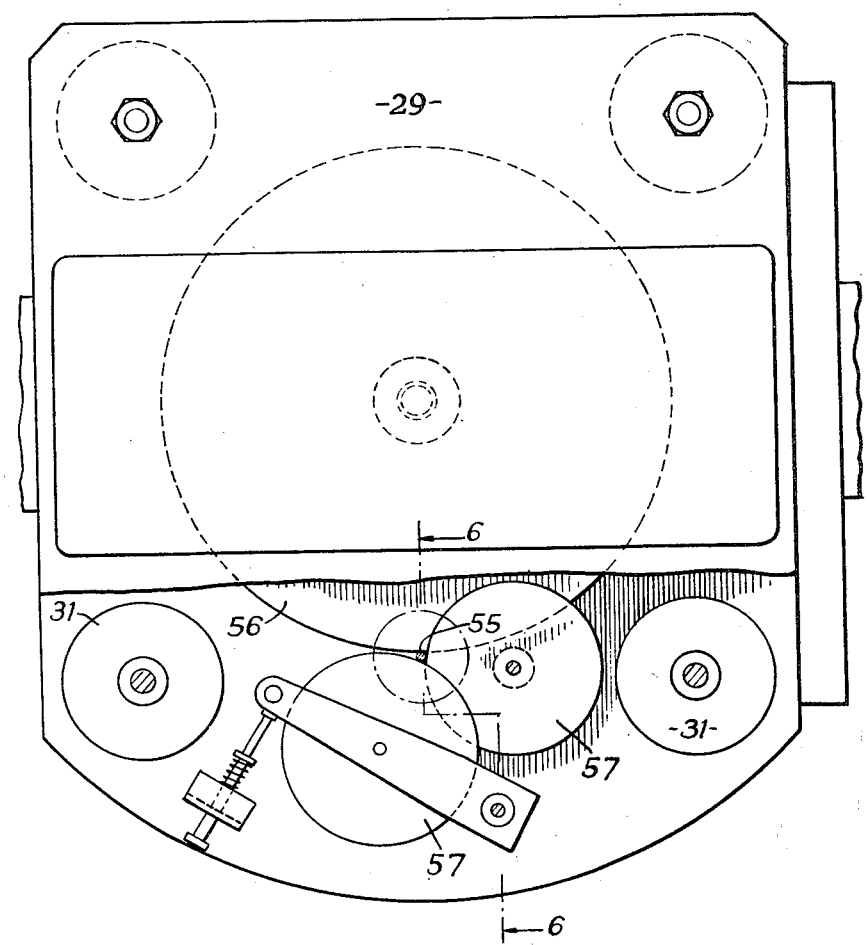

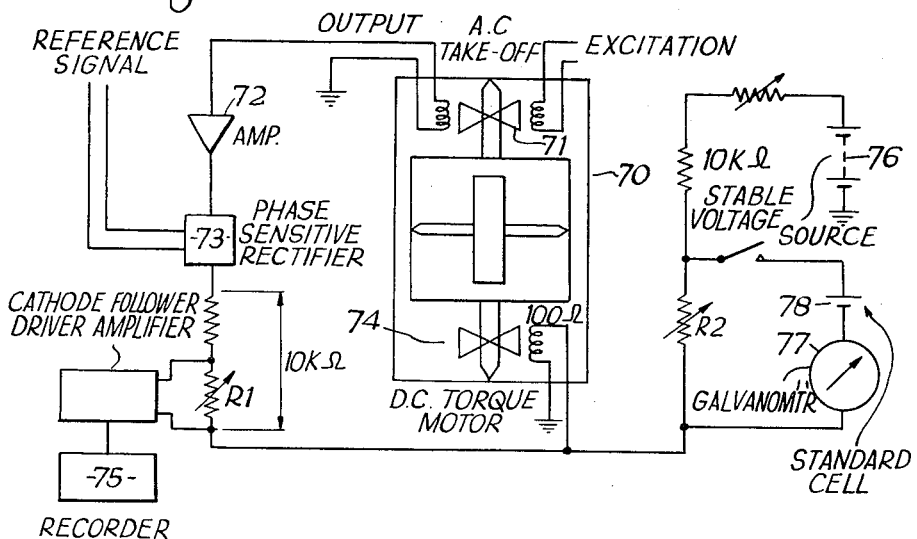
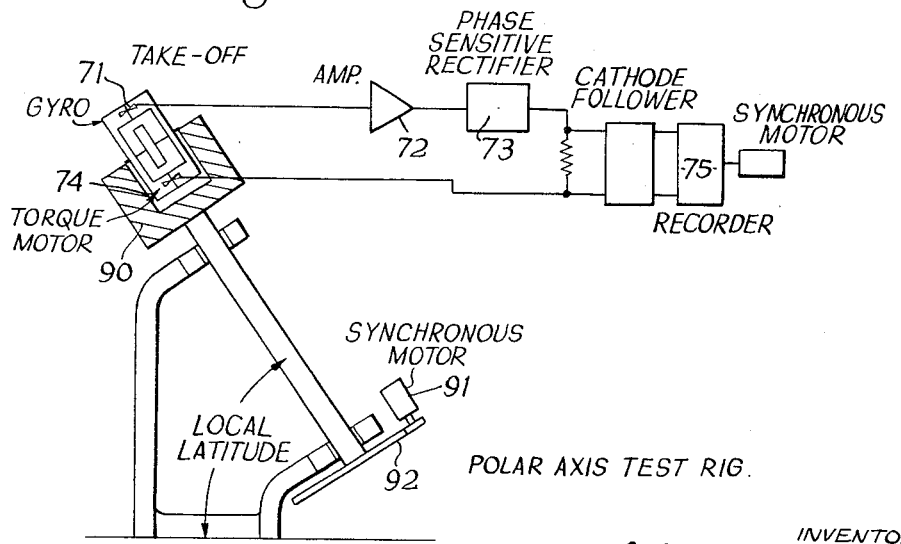

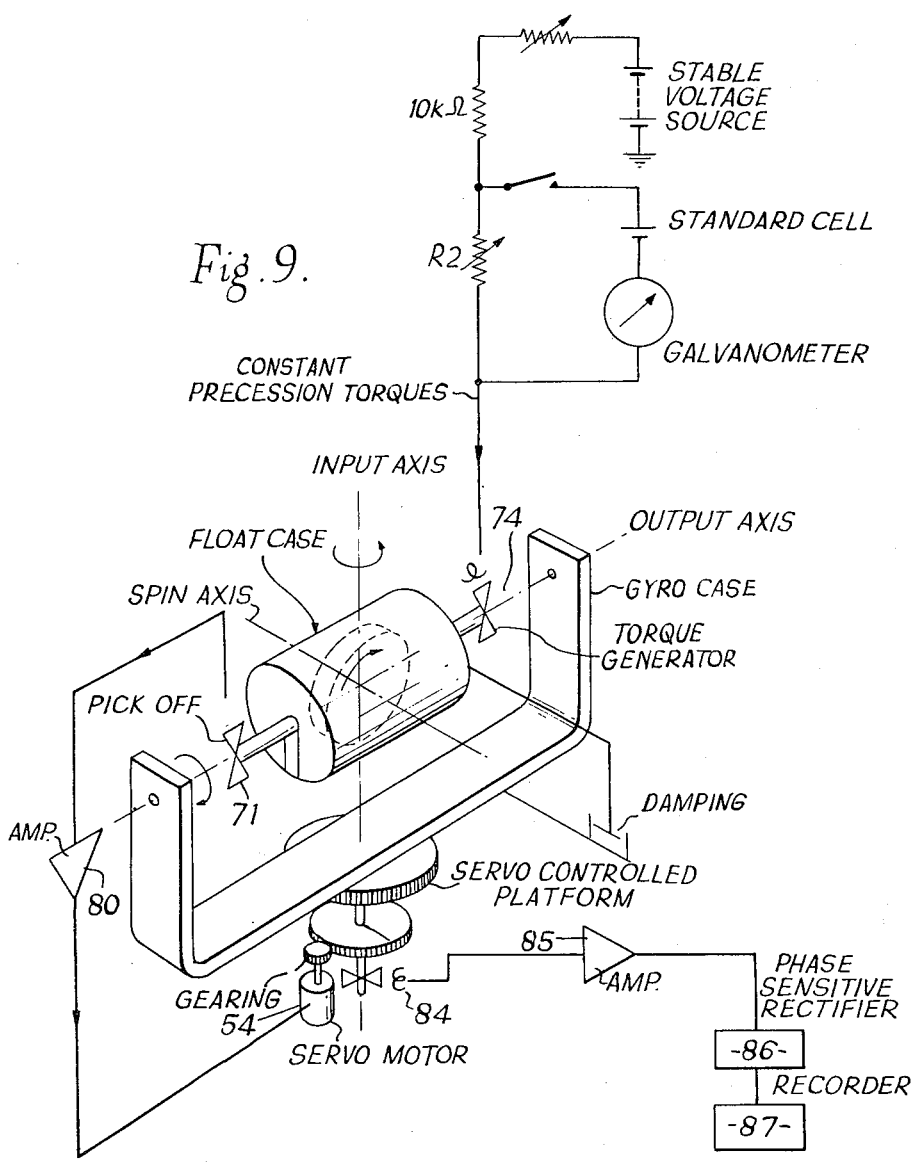

3,164,978
APPARATUS FOR TESTING GYROSCOPES

Godfrey Alan Sharman, Carloggas, Epsom Road, and John Alan Brooke Sharman, 16 Gateways, Epsom Road, both of Guildford, Surrey, England
Filed Aug. 31, 1959, Ser. No. 837,038
Claims priority, application Great Britain, Feb. 27, 1959, 7,040/59
10 Claims. (Cl. 73—1)

This invention relates to apparatus for the testing of gyroscopes and has for a principal object the provision of improved apparatus which enables a wide variety of tests to be carried out under conditions of high accuracy.

Another object of the present invention is to provide an improved apparatus which provides a full 360° freedom of movement about three mutually perpendicular axes so that a gyroscope mounted on the apparatus may be set up for testing in any desired position or attitude.

A further object of the invention is to provide a test apparatus which enables a wide variety of tests to be carried out on a gyroscope once it has been mounted in the apparatus and without necessitating any alteration in the mounting and without switching off.

Other objects and advantages of the apparatus of this invention will become apparent during the course of the following description with reference to the accompanying drawings, in which:

FIGURE 3 is a fragmentary section showing a detail of the apparatus,

FIGURE 4 is a fragmentary end elevation partly in section showing another detail of the apparatus, FIGURES 5 and 6 are respectively a plan and side elevation showing another detail of the apparatus, and FIGURES 7, 8, 9 and 10 are diagrammatic illustrations of various test set-ups, FIGURE 10 also showing diagrammatically a modification of the instrument of FIGURES 1 to 6.

Figure 1:
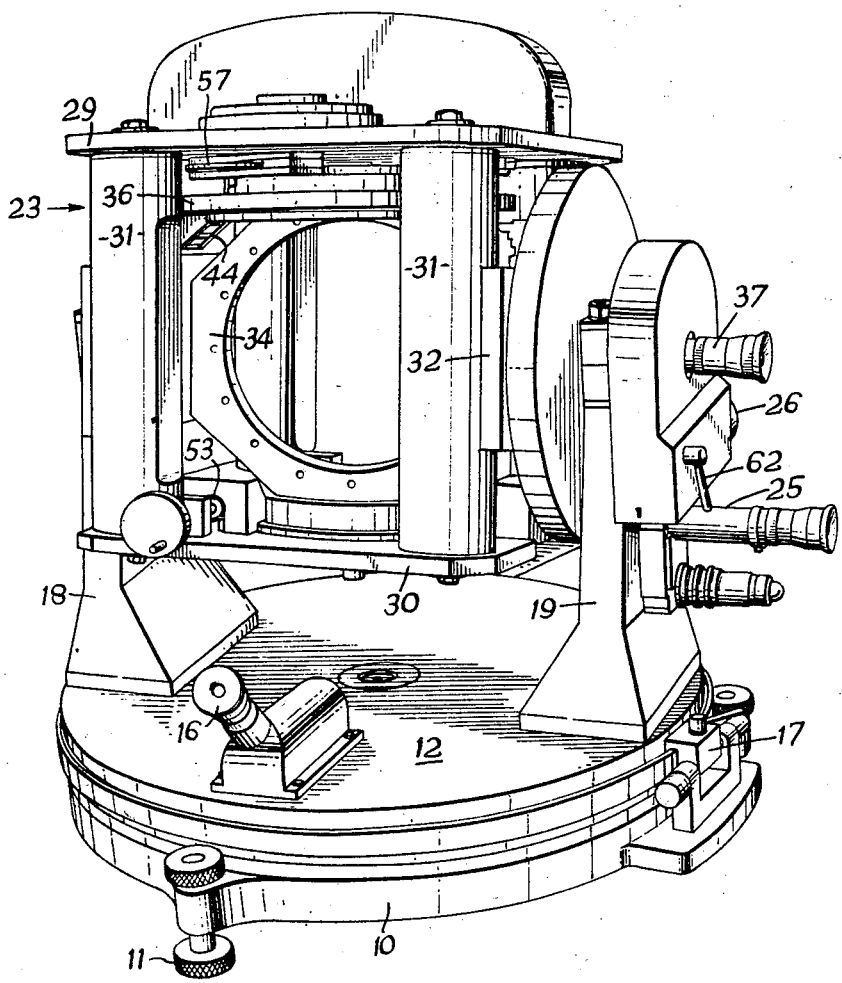
FIGURE 1 is a perspective view of the improved apparatus.

The improved apparatus of this invention comprises essentially a gimbal ring on which gyroscopes to be tested may be mounted and which is rotatably supported in a cage. In one form of the apparatus of this invention the cage is itself capable of being rotated about both horizontal and vertical axes, the gimbal ring axis being preferably normal to the horizontal axis. All three axes may be provided with means enabling a fine adjustment of the angular position to be effected and with graduated circular scales each of which may be read by means of a microscope. In addition a servo motor may be provided for moving the gimbal ring about its axis.

In another form of the apparatus the cage may be supported in a yoke or bracket arranged in such a manner that:

(a) The yoke or bracket can be rotated around an axis which can be positioned accurately parallel to the earth's axis of rotation, and (b) The cage can be rotated within the yoke or bracket, about an axis perpendicular to both the earth's axis of rotation and the axis of rotation of the gimbal ring supporting the gyroscope.

The design of both forms of the apparatus is such that the gyroscope under test can be mounted with its centre of gravity at approximately the intersection of the three axes (for example, azimuth, elevation and gimbal axes).

This feature means that gyroscopes of various sizes and weights can all be tested with a minimum of re-balancing of the equipment.

The symmetry of the support coupled with the above feature also means that large changes in weight of the equipment under test have a minimum adverse effect on angular alignments.

Referring now to FIGURES 1 to 6, the instrument there shown comprises a base 10 which is provided with adjustable levelling feet 11 and which supports a rotatable table 12. The table rotates around a pivot pin 13, the weight being taken on approximately equally spaced groups of rollers 14. Measurement of angular movement of table 12 may be effected by means of a circular scale 15, mounted on the base 10, and a reading microscope 16 (FIGURE 3) which may be calibrated to read 1 minute of arc or finer mounted on the table 12.

Fine adjustment of the angular position of the table may be effected by means of tangent screw mechanism 17. The table carries two pillars 18 and 19 which are provided at their upper ends with bearings 20 for receiving trunnions 21 and 22 mounted on opposite side faces of a cage 23.

In order that angular movement of the cage about the axis of its trunnions, that is about an axis which may conveniently be horizontal, may be measured there is provided on one side of the cage a circular scale 24, which may be similar to the scale 15, and a reading microscope 25 mounted on the pillar 19. Fine adjustment of the angular position of the cage 23 may be effected manually by means of a control knob 26 which drives worm 26' acting on worm wheel 27 which is fast with the trunnion 22.

The cage 23 may consist of end plates 29 and 30 which are held in spaced relation by four pillars 31 arranged adjacent the corners of the plates, and the trunnions 21 and 22 are carried on plates 32 which are attached to the sides of respective pairs of pillars.

The end plates 29 and 30 of the cage 23 are provided centrally with ball or roller bearings 33 supporting stub shafts extending outwardly from opposite sides of a gimbal ring 34 which provides a mounting for a gyroscope to be tested.

One of these central ball or roller bearings 33, preferably the one adjacent to end plate 30, may be provided with adjustment (that is radial/axial adjustments) in order to provide a convenient means of aligning the axis of rotation of the gimbal ring 34 with respect to the trunnion axis. The stub shafts extending outwardly from the gimbal ring may be made hollow in order that electrical and/or fluid supplies to the gyroscope may be passed through them and in addition these stub shafts may be used for mounting slip rings. The gimbal ring is provided at its end adjacent the end plate 29 with a circular scale 36 (FIGURE 2) which may be similar to the scales 15 and 24 and which may be read by means of a microscope 37 mounted in the hollow cage trunnion 20, the optical system including a light source 41, a half-silvered beam splitting prism 38 and double prism 39. In addition to the reading microscope 37, means is provided for reading out automatically the angular movement of the gimbal ring 34.

Figure 2:
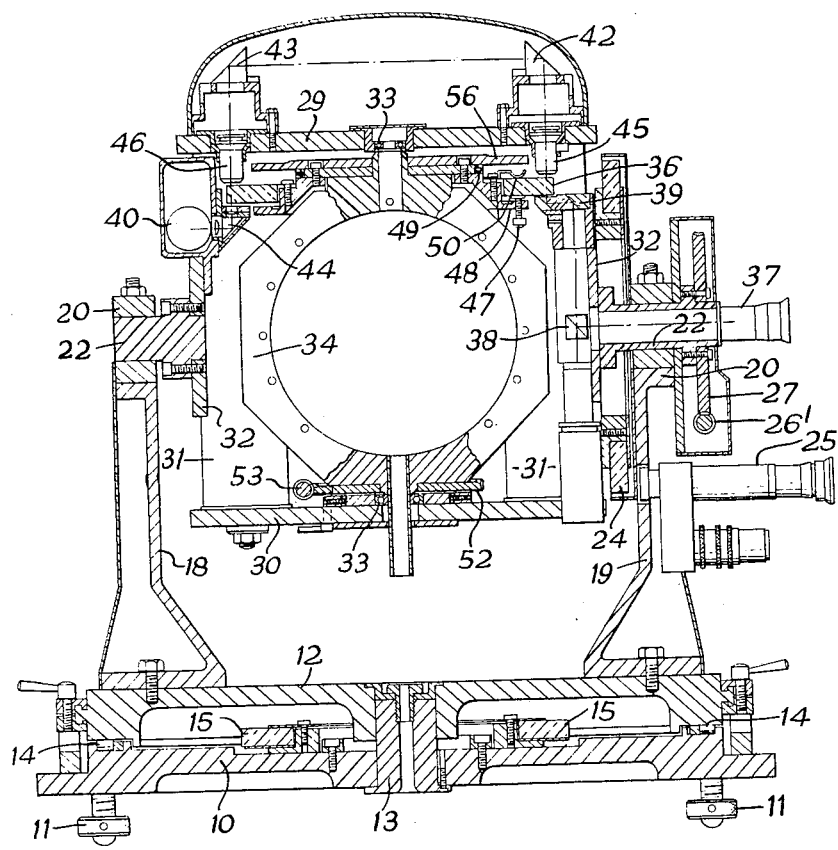
FIGURE 2 is a side elevation partly in section of the apparatus of FIGURE 1.

To this end there is provided, as indicated in FIGURE 2, a photo-electric cell 40 which receives light from the same source 41 as is used for the visual reading microscope 37 through the prisms 38 and 39 and also through the further prisms 42, 43 and 44 and objectives 45 and 46, the light passing through two or more approximately diametrically opposed points on the scale 36 which is in effect read simultaneously at these two points, so minimising inaccuracies caused by eccentric mounting of the divided circle.

The graduations on the scale 36 are conveniently formed as transparent markings on an opaque background and the photo cell 40 will thus provide an electrical signal when the image of the transparent marking or markings on one side of the circle coincide with a transparent mark or marks on the diametrically opposite side, for example at each minute of arc movement of gimbal ring 34. It will be appreciated that the optical system also includes a suitable means such as lenses or mirrors for focusing the light beam on each part of the scale.

The circular scales 15, 24 and 36 may all be made from annealed optical glass or quartz or other very stable material, and the described method of read-out enables full advantage to be taken of the accuracy with which circles of this type may be divided. In order that the divided circles may be free from strains due to differential expansion and/or other causes, and in order that they may readily be set to run true, both radially and axially, without the two adjustments interacting, each circle may be supported as shown in respect of the scale 36 by means of three equi-spaced blocks, provided with radial V grooves resting on the hemispherical ends of three levelling screws 47 which in turn may be carried by a hub 48. The hub, in its turn may be centered by the radial screws 49. The blocks may conveniently be made of an alloy having the same coefficient of thermal expansion as the material of the divided circle and may be cemented thereto. In addition, the circle and its support blocks may be urged towards the levelling screws by means of three ball ended springs 50, whose line of action coincides with the axis of the levelling screws.

In order that the automatic read-out may function with various preselected angular intervals, use may be made of division lines or marks of varying lengths together with a suitable mask or shutter mechanism or other field controlling device to restrict coincidence of the clear windows to the relevant portion of the division line and/or the relevant lines occupying specific positions.

In order to provide fine adjustment of the angular position of the gimbal ring 34, that end adjacent the end plate 30 may be provided with a worm wheel 52 which is engageable by a manually driven worm 53. This drive may be disengaged and the gimbal ring 34 driven alternatively by means of a servo motor 54 which is mounted on end plate 29 of the cage with its shaft 55 held in driving engagement with the rim of a disc 56 mounted on the upper end of the gimbal ring 34 by means of friction wheels 57, the arrangement providing a friction reduction gear free from slip and backlash.

The arrangement of the manually driven worm 53 and worm wheel 52 controlling the position of the gimbal ring 34 is essentially the same as that of the worm 26' and worm wheel 27 controlling the position of cage 23. In this arrangement, as shown in FIGURE 4, the worm 26' is mounted on a shaft 60 which is pivotally mounted at one end adjacent control knob 26 and is held in the position shown by spring 61. In order to disengage the worm 26' from worm wheel 27, a knob 62 is moved to turn lever 63 downwards, thereby to move shaft 60 downwards against the action of spring 61.

This instrument may be used for carrying out many different types of tests on one and two degree of freedom gyroscopes such as those used for inertial navigation purposes. Two main methods are used when evaluating the unbalance or measuring the wander rate of such gyroscopes—viz.: the closed loop and the servoed gimbal methods. In the closed loop method of measurement, which is illustrated in FIGURE 7, the gyroscope 70 is mounted on the gimbal ring 34 of the instrument of FIGURES 1 to 6 and the output from the gyroscope take off 71 is amplified at 72, phase sensitive rectified at 73 if required, and fed back to the gyroscope torque motor 74 in the correct sense to "servo" the take off to the null position. Under these conditions the circuit functions as a closed loop servo mechanism and a record of the current flowing through the torque motor 74 provides a measure of the torque required to hold the take off at null in the presence of unbalance torques acting on the gyroscope gimbal. As shown, the record of the variable current flowing in the torque motor 74 is provided by a recorder 75 while a constant current of desired value is supplied to the torque motor from a source 76, a galvanometer 77 and standard cell 78 being provided to enable the value of such constant current to be checked.

Figure 8:
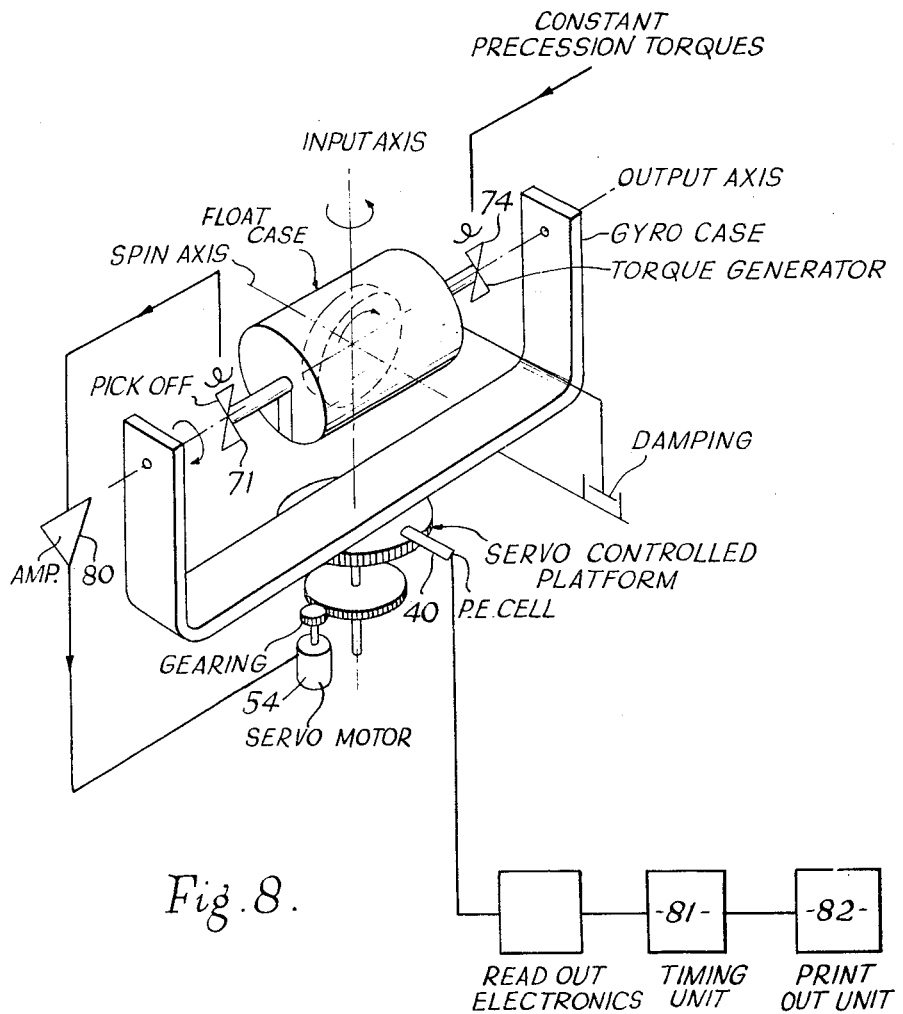

In the servoed gimbal test illustrated diagrammatically in FIGURE 8, the output from the gyroscope take off 71 is amplified at 80, passed through a stabilising or shaping network and/or phase sensitive rectifier if required, and fed back to control the servo motor 54 which drives the gimbal ring 34 (FIGURES 1 to 6), the arrangement thus forming a single-axis stabilised platform, for example the gimbal ring 34, which can be swivelled into any attitude. By means of the scale 36 fixed to gimbal ring 34 and the photo-electric read-out device including photo cell 40, and a suitable timing device 81 the times taken for the gimbal ring 34 to rotate through successive equal angular intervals may be measured and by means of a suitable print-out device 82 such as an electric typewriter may be automatically recorded over a period of time. If the rates of rotation are computed and the appropriate component of earth's rotation rate substracted, the remainders may be taken as a measure of the wander rate of the gyroscope.

Alternatively, as illustrated diagrammatically in FIGURE 9, the instrument may be fitted with an auxiliary alternating current take off 84 between the gimbal ring 34 and the cage 23. Then, by connecting this auxiliary take off to an amplifier 85, phase sensitive rectifier 86 and a wide chart recorder 87 and by passing through the gyroscope torque motor 74 an unvarying current of such a sign and magnitude as exactly to cancel earth's rotation plus the average wander rate, the instrument can be used to obtain a continuous record of the angular deviations of the servoed platform, for example gimbal ring 34, from its mean position.

Owing to its design, this instrument can be used, without stopping or remounting the gyroscope, as a three axis precision dividing head for closed loop tests or alternatively, by using the servo control of the gimbal ring 34 it can be used to study the performance of the gyroscope while the latter is actually stabilising a platform. When used for either test all three axes have 360° freedom of movement.

The above features mean that at one mounting and one switch-on a gyroscope can be subjected to all the following tests:

(a) The gimbal torque motors of the gyroscope can be calibrated either against earth's turning rate or by direct measurement of the precession rate produced;

(b) A 6 or more attitude balance check can be carried out by either the closed loop or the servoed gimbal method; when the equipment is used in conjunction with a suitable current recorder, the closed loop test data is continuously recorded without the need for an operator in constant attendance; similarly if use is made of the photo electrical read-out together with a suitable timing/print-out device the servoed gimbal test also becomes fully automatic;

(c) The wander rate can be measured in any attitude;

(d) The transfer function (ratio of input to output movement) of a single axis rate integrating gyroscope can be measured by rotating the input axis through an accurately known angle;

(e) The alignment of the input axis or the spin axis can be checked by rotating the gyroscope through a known angle around the spin axis;

(f) Using the rig as a precision dividing head the rate threshold of the gyroscope or the gyroscope gimbal bearing friction level can be estimated either by observing the smallest component of earth's rotation which the gyroscope can detect or by observing, on closed loop test, the apparent change in steady wander rate after the input axis has been rotated through an input angle of the order of one or two minutes of arc.

In the alternative form of the apparatus previously referred to and which is illustrated diagrammatically in FIGURE 10, the cage 23 is rotatably supported by its trunnions 21 and 22 in a yoke or bracket 90 which in its turn may be rotated around an axis parallel with the earth's axis. Using this device the gyroscope may be isolated from the effects of earth's rotation by rotating the yoke or bracket uniformly at the rate of 1 complete revolution per siderial day in the opposite direction to that in which the earth rotates. The advantage of this arrangement of the gyroscope tester is that the gyroscope may, as before, be positioned in any attitude but the exact elimination of the effects due to earth's rotation depends only upon the alignment of a single axis and the uniformity and correctness of the rotation. The exact axis alignments within the gyroscope under test become relatively unimportant. This arrangement may be used in carrying out the above described tests and the circuit illustrated in FIGURE 9 is that for the closed loop test described with reference to FIGURE 7.

A convenient method of drive may consist of an electrically driven tuning fork, quartz crystal or similar device, an amplifier, a synchronous motor 91 and a precision reduction gear train 92. Conveniently, the final stage of the reduction gear may be a worm and wheel. In order to minimise the residual errors which arise in the cutting of the worm and wheel they may afterwards be calibrated, the error may then be represented by the contour (for example the radius) of a cam arranged to rotate with the worm wheel. By means of a cam follower and a system of levers moving the worm axially or by means of a differential gear used to add to or subtract from the uniform shaft rotation driven from the synchronous motor in the common sense, this cam may then be used exactly to correct for the measured error in the worm and worm wheel.

It will be appreciated that the instrument described herein is of a massive and rigid nature and that the various bearings are constructed with a high degree of precision to allow exact adjustment of the angular position of the various parts. Preferably the instrument is constructed entirely of non-magnetic materials.

We claim:

1. Gyroscope testing apparatus comprising a gimbal ring for supporting a gyroscope under test, a cage member surrounding said gimbal ring and having bearing means for supporting said ring for rotation relative to said cage member through 360° about a first axis, a base member, a table mounted on said base member for rotation relative thereto through 360° about a second axis, support means for said cage member mounted on said table, and including bearing means supporting said cage member for rotation relative to said support means through 360° about a third axis, said first, second and third axes intersecting at the centre of said gimbal ring, scale members on each of the said gimbal ring, said cage member, and said base member, and a reading means for said scales on each of said cage member, said support means and said table, the respective reading means being aligned with the respective scales.

2. Apparatus for testing gyroscopes including a base member, a table mounted on said base member for rotation relative thereto through 360° about a first axis, support means mounted on said table, a cage member mounted between said support means for rotation relative thereto through 360° about a second axis which extends normal to said first axis, and a gimbal ring for supporting a gyroscope under test mounted in said cage member for rotation relative thereto through 360° about a third axis which extends normal to said second axis, said three axes intersecting at the centre of said gimbal ring, scale members on each of the said gimbal ring, said cage member, and said base member, and a reading means for said scales on each of said cage member, said support means and said table, the respective reading means being aligned with the respective scales.

3. Apparatus for testing gyroscopes including a base member, a table mounted on said base member for rotation relative thereto through 360° about a first axis, support means mounted on said table, a cage member mounted between said support means for rotation relative thereto through 360° about a second axis which extends normal to said first axis, a gimbal ring for supporting a gyroscope under test mounted in said cage member for rotation relative thereto through 360° about a third axis which extends normal to said second axis, an annular scale on said base and extending normal to the axis of rotation thereof, optical means on said table for reading said base scale, an annular scale mounted on said cage normal to the axis of rotation thereof, optical means on said support means for reading said cage scale, an annular scale mounted on said gimbal ring and extending normal to the axis of rotation thereof, and optical means on said cage member for reading said scale.

4. Apparatus for testing gyroscopes including a base member, a table mounted on said base member for rotation relative thereto through 360° about a first axis, support means mounted on said table, a cage member mounted between said support means for rotation relative thereto through 360° about a second axis which extends normal to said first axis, a gimbal ring for supporting a gyroscope under test mounted in said cage member for rotation relative thereto through 360° about a third axis which extends normal to said second axis, scale members on each of the said gimbal ring, said cage member, and said base member, and a reading means for said scales on each of said cage member, said support means and said table, the respective reading means being aligned with the respective scales and motor means on said cage member for rotating said gimbal ring.

5. Apparatus for testing gyroscopes comprising a base member, a table mounted on said base member for rotation relative thereto through 360° about a first axis, support means mounted on said table, a cage member mounted between said support means for rotation relative thereto through 360° about a second axis which extends normal to said first axis, and a gimbal ring for supporting a gyroscope under test mounted in said cage member for rotation relative thereto through 360° about a third axis which extends normal to said second axis, an annular scale mounted on said gimbal ring and extending normal to the axis of rotation thereof, said scale having alternate transparent and opaque markings, a light source carried by said cage member and illuminating a part of said scale, and a photo cell carried by said cage member for receiving light from said source transmitted through said scale, and for generating a pulse as each marking passes a reference point.

6. Apparatus for testing gyroscopes comprising a base member, a table mounted on said base member for rotation relative thereto through 360° about a first axis, support means mounted on said table, a cage member mounted between said support means for rotation relative thereto through 360° about a second axis which extends normal to said first axis, and a gimbal ring for supporting a gyroscope under test mounted in said cage member for rotation relative thereto through 360° about a third axis which extends normal to said second axis, an annular scale mounted on said gimbal ring and extending normal to the axis of rotation thereof, said scale having alternate transparent and opaque markings, a light source carried by said cage member and illuminating a part of said scale, means for directing light from said source and transmitted through said part of said scale on to another part of said scale, and a photo cell for receiving light transmitted through said another part of said scale.

7. Apparatus for testing gyroscopes comprising a cage member, a gimbal ring mounted in bearing means supported by said cage member for rotation relative thereto, said gimbal ring supporting a gyroscope to be tested which gyroscope includes a torque motor and a take off, means for amplifying the output from said take off and applying the amplifier output to said torque motor, and means for measuring variations in current in said torque motor.

8. Apparatus for testing gyroscopes comprising a cage member, a bracket supporting said cage member, means for rotating said bracket about an axis extending parallel to the earth's axis, a gimbal ring mounted in bearing means supported by said cage member for rotation relative thereto, said gimbal ring supporting a gyroscope to be tested which gyroscope includes a torque motor and a take off, means for amplifying the output from said take off and applying the amplifier output to said torque motor, and means for measuring variations in current in said torque motor.

9. Apparatus for testing gyroscopes comprising a cage member, a gimbal ring mounted in bearing supported by said cage member for rotation relative thereto, said gimbal ring supporting a gyroscope to be tested which gyroscope includes a take off and a torque motor, a servo motor mounted on said cage member for rotating said gimbal ring, means for amplifying the output from said take off, means for applying said amplified output to energise said servo motor, an auxiliary take off connected between said cage and said gimbal ring, and means for recording the output from said auxiliary take off.

10. Apparatus for testing gyroscopes comprising a cage member, a gimbal ring mounted in bearings supported by said cage member for rotation relative thereto, said gimbal ring supporting a gyroscope to be tested which gyroscope includes a take off and a torque motor, a servo motor mounted on said cage member for rotating said gimbal ring, means for amplifying the output from said take off, means for applying said amplified output to energise said servo motor, read out means for measuring angular movement of said gimbal ring, means for timing the movement of said gimbal ring through equal angular intervals, and means for printing the length of time of each said interval.

References Cited by the Examiner
UNITED STATES PATENTS

| | | | |
|---|---|---|---|
| 1,374,162 | 4/21 | Meitner | 73—1 |
| 2,470,773 | 5/49 | Haskins | 73—1 |
| 2,544,851 | 3/51 | McCarthy et al. | 73—1 X |
| 2,735,191 | 2/56 | Carter | 33—226 |
| 2,752,792 | 7/56 | Draper | 33—222.7 X |
| 2,811,043 | 10/57 | Bonnell | 74—5.34 |
| 2,906,128 | 9/59 | Schoeppel | 74—5.34 |
| 2,968,956 | 1/61 | Agins | 33—226 X |

ISAAC LISANN, *Primary Examiner.*